United States Patent
Noh et al.

(10) Patent No.: US 11,038,736 B2
(45) Date of Patent: Jun. 15, 2021

(54) METHOD FOR CANCELLING SELF-INTERFERENCE SIGNAL WHEN OPERATING IN FDR MODE, AND DEVICE THEREFOR

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Kwangseok Noh, Seoul (KR); Daesik Hong, Seoul (KR); Haesoon Lee, Seoul (KR); Jaeyeong Choi, Seoul (KR); Dongkyu Kim, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 12 days.

(21) Appl. No.: 16/318,687

(22) PCT Filed: Mar. 2, 2017

(86) PCT No.: PCT/KR2017/002248
§ 371 (c)(1),
(2) Date: Jan. 17, 2019

(87) PCT Pub. No.: WO2018/016710
PCT Pub. Date: Jan. 25, 2018

(65) Prior Publication Data
US 2019/0190764 A1    Jun. 20, 2019

Related U.S. Application Data

(60) Provisional application No. 62/364,866, filed on Jul. 21, 2016.

(51) Int. Cl.
*H04L 27/26* (2006.01)
*H04L 5/18* (2006.01)
*H04B 1/525* (2015.01)

(52) U.S. Cl.
CPC ......... *H04L 27/2691* (2013.01); *H04B 1/525* (2013.01); *H04L 5/18* (2013.01); *H04L 27/2657* (2013.01)

(58) Field of Classification Search
CPC .............................. H04L 27/2691; H04L 5/18
See application file for complete search history.

(56) References Cited

U.S. PATENT DOCUMENTS 6,480,558 B1 * 11/2002 Ottosson .............. H04B 1/7107
  375/350
8,725,067 B2 * 5/2014 Ahn .................... H04B 7/15542
  455/11.1

(Continued)

FOREIGN PATENT DOCUMENTS

WO    2010019017    2/2010
WO    2014208953    12/2014

OTHER PUBLICATIONS

PCT International Application No. PCT/KR2017/002248, Written Opinion of the International Searching Authority dated May 23, 2017, 23 pages.

*Primary Examiner* — Rasheed Gidado
(74) *Attorney, Agent, or Firm* — Lee Hong Degerman Kang Waimey

(57) ABSTRACT

A method by which a first network node cancels a self-interference signal when operating in a full duplex radio (FDR) mode in a wireless network can comprise the steps of: cancelling a self-interference signal on the basis of frequency synchronization estimation of the self-interference signal when frequencies of a reception signal received from a second network node and the self-interference signal are (Continued)

asynchronous; and estimating frequency synchronization of the reception signal by using a residual signal according to the cancellation of the self-interference signal, and detecting the reception signal on the basis of the frequency synchronization estimation of the reception signal.

12 Claims, 7 Drawing Sheets

(56) References Cited

U.S. PATENT DOCUMENTS

| | | | |
|---|---|---|---|
| 8,750,439 B2* | 6/2014 | Ancora | H04B 7/024 375/347 |
| 8,780,964 B2* | 7/2014 | Subramanian | H04L 27/2678 375/219 |
| 9,071,313 B2* | 6/2015 | Monsen | H04B 1/10 |
| 9,094,275 B1* | 7/2015 | Papadimitriou | H04L 27/2688 |
| 9,277,519 B1* | 3/2016 | Pu | H04L 27/2662 |
| 10,153,924 B2* | 12/2018 | Kim | H04L 25/0328 |
| 10,439,706 B2* | 10/2019 | Michaels | H04B 7/2041 |
| 2002/0044614 A1* | 4/2002 | Molnar | H04B 1/7105 375/346 |
| 2003/0063596 A1* | 4/2003 | Arslan | H04L 25/03993 370/347 |
| 2005/0041693 A1* | 2/2005 | Priotti | H04L 27/2657 370/503 |
| 2009/0034437 A1* | 2/2009 | Shin | H04L 25/022 370/278 |
| 2009/0180404 A1* | 7/2009 | Jung | H04L 25/0204 370/279 |
| 2013/0301487 A1 | 11/2013 | Khandani | |
| 2014/0307830 A1* | 10/2014 | Hahm | H04L 27/2657 375/296 |
| 2014/0348018 A1* | 11/2014 | Bharadia | H04L 5/1423 370/252 |
| 2015/0043685 A1* | 2/2015 | Choi | H04L 27/2691 375/346 |
| 2016/0119110 A1 | 4/2016 | Kim et al. | |
| 2016/0143013 A1* | 5/2016 | Kim | H04B 17/345 370/329 |
| 2017/0141886 A1* | 5/2017 | Chung | H04W 72/0406 |

* cited by examiner

METHOD FOR CANCELLING SELF-INTERFERENCE SIGNAL WHEN OPERATING IN FDR MODE, AND DEVICE THEREFOR

CROSS-REFERENCE TO RELATED APPLICATIONS

This application is the National Stage filing under 35 U.S.C. 371 of International Application No. PCT/KR2017/002248, filed on Mar. 2, 2017, which claims the benefit of U.S. Provisional Application No. 62/364,866, filed on Jul. 21, 2016, the contents of which are all hereby incorporated by reference herein in their entirety.

TECHNICAL FIELD

The present invention relates to a wireless communication, and more particularly, to a method of cancelling a self-interference signal in a situation of operating in an FDR mode and an apparatus therefor.

BACKGROUND ART

Full-duplex communication is a technology capable of theoretically doubling the capacity of a system compared to conventional half-duplex communication in which time resources or frequency resources are orthogonally divided by performing transmission and reception simultaneously by a node.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE OF THE INVENTION

Technical Tasks

A technical task of the present invention is to provide a method of cancelling a self-interference signal when a first network node operates in an FDR mode in a wireless network.

Another technical task of the present invention is to provide a first network node for cancelling a self-interference signal when the first network node operates in an FDR mode in a wireless network.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of cancelling a self-interference signal in a situation that a first network node operates in an FDR (Full Duplex Radio) mode in a wireless network includes, when a frequency of a reception signal received from a second network node is not synchronized with a frequency of the self-interference signal, cancelling the self-interference signal based on frequency synchronization estimation of the self-interference signal, and estimating frequency synchronization of the reception signal using a residual signal according to the cancellation of the self-interference signal and detecting the reception signal based on the frequency synchronization estimation of the reception signal.

The cancelling the self-interference signal can further include transforming the self-interference signal into a signal of a frequency domain based on the estimated frequency synchronization of the self-interference signal, estimating a channel of the self-interference signal based on the transformed signal of the frequency domain, generating a self-interference signal in the frequency domain based on the channel estimation of the self-interference signal, and transforming the generated self-interference signal in the frequency domain into a self-interference signal of a time domain.

The cancelling the self-interference signal can further include cancelling the self-interference signal in a manner of subtracting the converted self-interference signal of the time domain from the estimated frequency synchronization self-interference signal.

The second network node can also operate in the FDR mode.

The detecting the reception signal can further include the steps of transforming the residual signal into a residual signal of a time domain after compensating for a frequency offset based on the frequency synchronization estimation of the reception signal, and detecting the reception signal based on channel estimation on the transformed residual signal of the time domain.

The frequency synchronization estimation of the reception signal can be performed based on a preamble of the reception signal included in the residual signal after the self-interference signal is cancelled.

To further achieve these and other advantages and in accordance with the purpose of the present invention, according to a different embodiment, a first network node operating in an FDR (Full Duplex Radio) mode for cancelling a self-interference signal in a wireless network can include a processor, when a frequency of a reception signal received from a second network node is not synchronized with a frequency of the self-interference signal, the processor is configured to cancel the self-interference signal based on frequency synchronization estimation of the self-interference signal, the processor is configured to estimate frequency synchronization of the reception signal using a residual signal according to the cancellation of the self-interference signal and detect the reception signal based on the frequency synchronization estimation of the reception signal.

The processor may transform the self-interference signal into a signal of a frequency domain based on the estimated frequency synchronization of the self-interference signal, estimates a channel of the self-interference signal based on the transformed signal of the frequency domain, generate a self-interference signal of the frequency domain based on the channel estimation of the self-interference signal, and transform the generated self-interference signal of the frequency domain into a self-interference signal of a time domain.

The processor may cancel the self-interference signal in a manner of subtracting the converted self-interference signal of the time domain from the estimated frequency synchronization self-interference signal.

The processor may transform the residual signal into a residual signal of a time domain after compensating for a frequency offset based on the frequency synchronization estimation of the reception signal and detect the reception signal based on channel estimation on the converted residual signal of the time domain. The second network node can also operate in the FDR mode.

The processor may perform the frequency synchronization estimation of the reception signal based on a preamble of the reception signal included in the residual signal after the self-interference signal is cancelled.

When the first network node corresponds to a user equipment, the second network node may correspond to a base station. When the first network node corresponds to a base station, the second network node may correspond to a user equipment.

Advantageous Effects

According to a self-interference cancellation scheme proposed in the present invention, it is able to successfully perform self-interference cancellation and reception signal detection using a method of respectively performing frequency synchronization on a transmission signal and a reception signal in environment that two network nodes transmit a signal at the same time and a frequency offset occurs due to an oscillator error and a Doppler effect.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention.

BEST MODE

Mode for Invention

Figure 1:
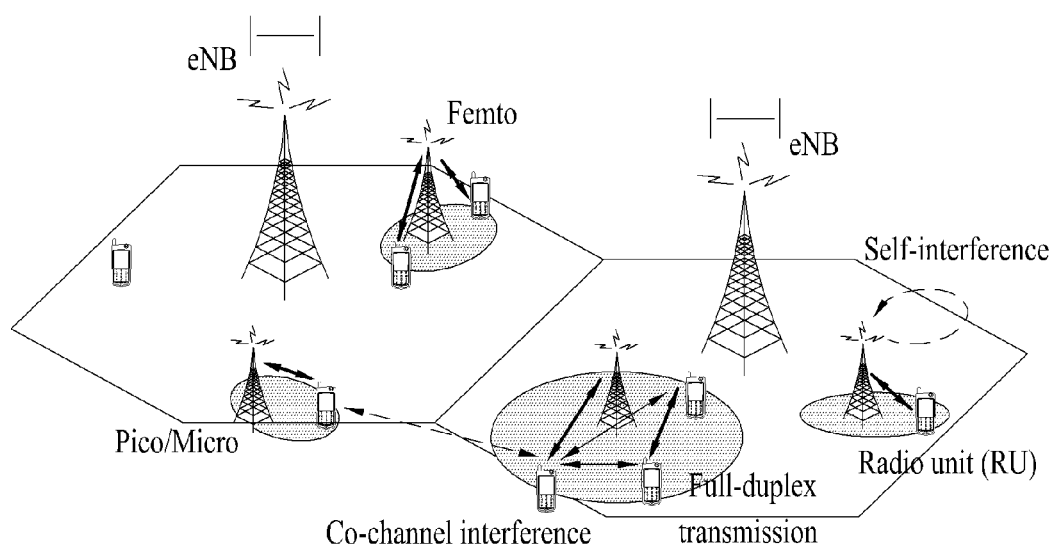
FIG. 1 is a conceptual diagram of a user equipment and a base station supporting FDR.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
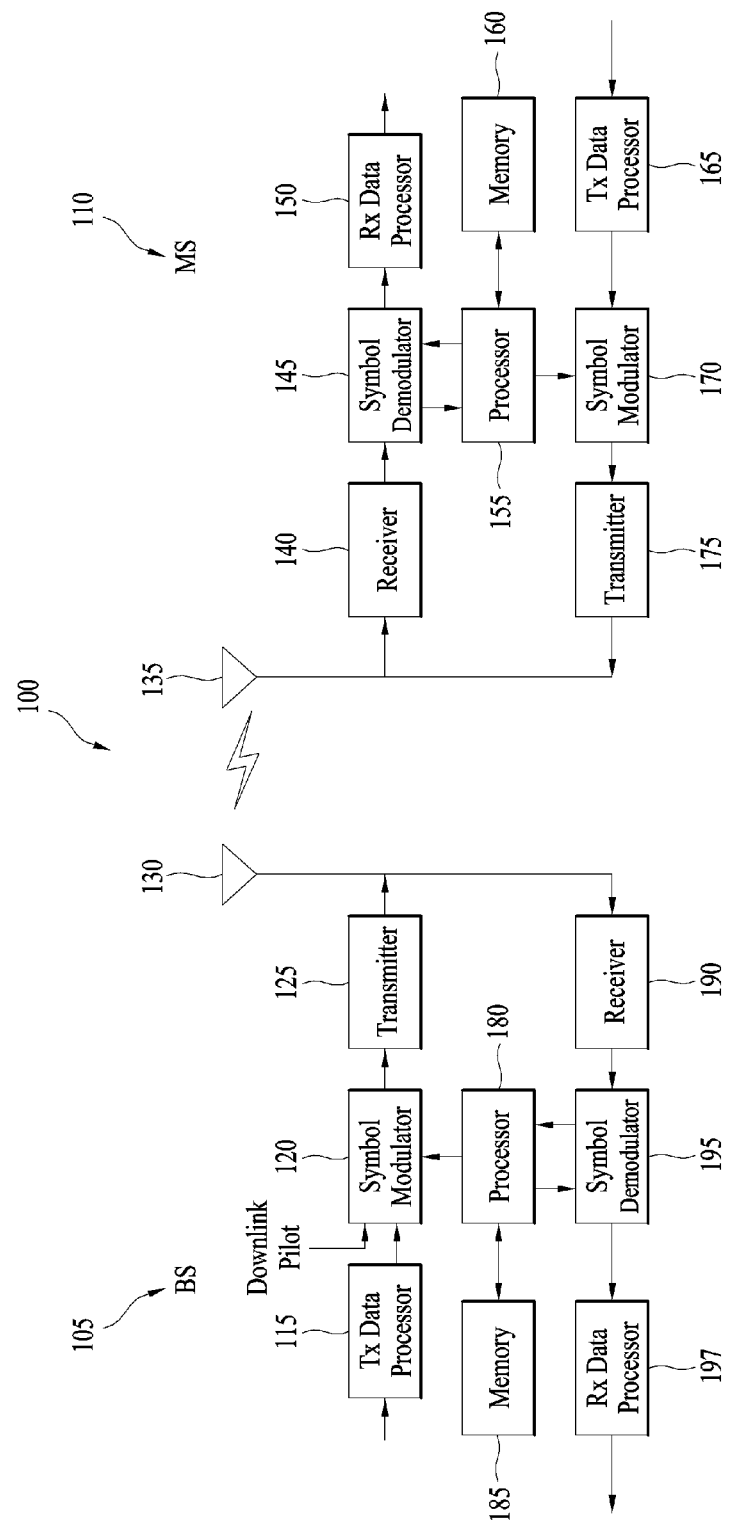
FIG. 2 is a block diagram illustrating configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention relates to self-interference cancellation in FDR communication. The present invention proposes a technique of cancelling self-interference after minimizing non-linearity of a power amplifier using a digital pre-compensation algorithm. To this end, the present invention proposes a structure of a reference signal and an operation method of a pre-compensation algorithm.

Figure 3:
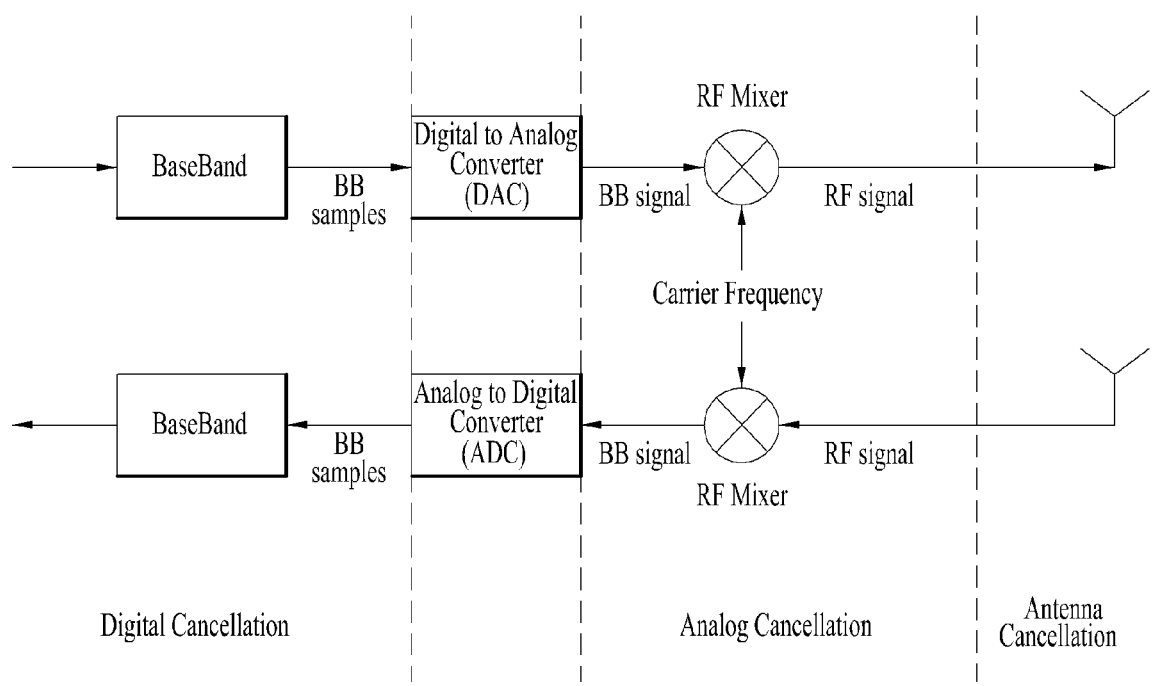
FIG. 3 is a diagram illustrating positions to which three interference schemes are applied in an RF transmitting end/receiving end of a device.

Types of self-interference cancellation (self-IC) schemes and application method FIG. 3 is a diagram illustrating positions to which three interference schemes are applied in an RF transmitting end/receiving end of a device.

FIG. 3 illustrates positions to which three self-interference cancellation (self-IC) schemes are applied. In the following, a brief description will be given of the three Self-IC schemes.

Antenna Self-IC scheme: Antenna Self-IC scheme is a Self-IC scheme that should be performed first among all Self-IC schemes. SI is cancelled at an antenna end. Most simply, transfer of an SI signal may be blocked physically by placing a signal-blocking object between a Tx antenna and an Rx antenna, the distance between antennas may be controlled artificially using multiple antennas, or a part of an SI signal may be canceled through phase inversion of a specific Tx signal. Further, a part of an SI signal may be cancelled by means of multiple polarized antennas or directional antennas.

Analog Self-IC scheme: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC scheme: Interference is canceled after an Rx signal passes through an ADC. Digital Self-IC scheme covers all IC techniques performed in a baseband region. Most simply, a duplicate of an SI signal is generated using a digital Tx signal and subtracted from an Rx digital signal. Or, techniques of performing precoding/postcoding in a baseband using multiple antennas so that a Tx signal of a UE or an eNB may not be received at an Rx antenna may be classified into digital Self-IC scheme. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

The above mentioned self-interference cancellation schemes consider environment that synchronization of a transmitter is matched with synchronization of a receiver. Since synchronization of a Tx signal is matched with synchronization of an Rx signal, if the receiver identically uses a scheme used in legacy half-duplex mode communication to match frequency synchronization, it is able to cancel a self-interference signal without any problem.

However, when two network nodes actually communicate with each other using a full duplex communication technique, it is practically impossible to match frequency synchronization between the two network nodes. When synchronization of a Tx signal is matched with synchronization of an RX signal in one network node, another network node may have no choice but to experience an asynchronous situation as much as double of a Doppler effect. Frequency synchronization affects an Rx signal only in a half-duplex communication system. On the contrary, frequency synchronization affects not only an Rx signal but also a self-interference signal in a full-duplex communication system. Hence, the frequency asynchronous situation may considerably affect self-interference cancellation. Hence, it is necessary to have a self-interference cancellation scheme capable of mitigating performance deterioration in the frequency asynchronous environment.

In the foregoing description, it is assumed that frequency synchronization is matched between network nodes operating in an FDR mode. In this case, since a Tx signal and an Rx signal have the same frequency, if sampling is performed by matching frequency synchronization with the Rx signal, frequency synchronization of the Tx signal is automatically matched. As a result, it is able to successfully perform self-interference cancellation. However, in the frequency asynchronous environment, if frequency synchronization is matched with the Rx signal, frequency synchronization of the Tx signal is not matched. As a result, when self-interference in which the Tx signal is immediately received is received, additional interference occurs due to a frequency asynchronous problem. Since power of the Tx signal is dozens times stronger than power of the Rx signal, if additional interference occurs on a self-interference signal and self-interference cancellation performance is deteriorated, SINR of the Rx signal can be considerably lowered.

Figure 4:
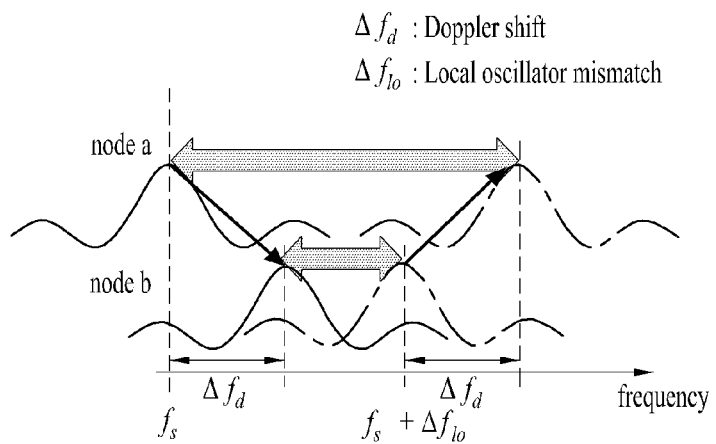
FIG. 4 is an exemplary diagram for explaining a problem of a frequency synchronization mismatch between two network nodes in frequency asynchronous environment using communication in an FDR mode.

FIG. 4 is an exemplary diagram for explaining a problem of a frequency synchronization error between two network nodes in frequency asynchronous environment using communication in an FDR mode.

FIG. 4 illustrates a frequency asynchronous situation under the assumption that two network nodes using FDR mode communication transmit a signal at the same time. A frequency synchronization difference between an Rx signal and a self-interference signal is determined by a Doppler effect which is generated between the two network nodes (nodes a and b) and an oscillator mismatch between the two network nodes. When a receiving end of a node performs an OFDM reception operation on the basis of an Rx signal received from an opposite side node (node b), a self-interference signal may have a frequency synchronization mismatch. As a result, inter-channel interference occurs on the self-interference signal. Since legacy self-interference cancellation schemes do not consider the frequency synchronization mismatch, it is unable to precisely cancel a self-interference signal which is distorted due to the inter-channel interference.

Figure 5:
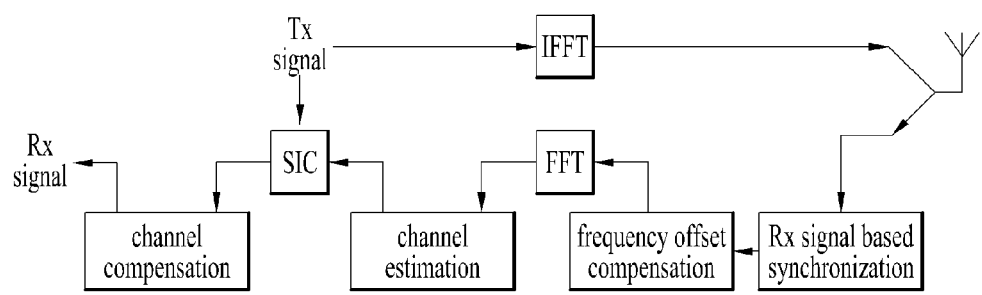
FIG. 5 is an exemplary diagram for explaining an operation process of a digital self-interference cancellation (SIC) scheme in a network node.

FIG. 5 is an exemplary diagram for explaining an operation process of a digital self-interference cancellation (SIC) scheme in a network node.

FIG. 5 illustrates an operation process of a digital self-interference cancellation scheme in detail. A system performing communication in an FDR mode and an HD mode may operate as follows. As shown in FIG. 5, in order to detect an Rx signal in environment to which an OFDM scheme is applied, a receiving end of a network node compensates for a frequency offset in accordance with frequency synchronization of the Rx signal and performs FFT (Fast Fourier Transform). In case of performing communication in the HD mode, an Rx signal is detected on the basis of the sampling. In case of performing communication in the FDR mode, self-interference is cancelled based on the sampling and information on a Tx signal and an Rx signal is detected.

According to the related art, when two network nodes perform communication in the FDR mode, since a frequency asynchronous situation is not considered in a situation that a self-interference signal and an Rx signal are received at the same time, frequency synchronization is configured in consideration of the Rx signal only. As a result, distortion occurs on the self-interference signal due to a frequency synchronization mismatch after the self-interference signal is passed through FFT calculation. In particular, it is unable to sufficiently obtain self-interference cancellation performance using a legacy self-interference cancellation scheme having a form of subtracting the multiplication of a Tx signal and a self-interference channel. This can be comprehended as a performance loss resulted from subtracting the multiplication of the Tx signal and the self-interference channel without reflecting the distortion due to the frequency synchronization mismatch.

Consequently, according to the legacy scheme, performance is degraded in the aspect of SINR. The frequency asynchronous phenomenon occurs in actual communication environment due to a mismatch phenomenon between oscillators of two nodes and a Doppler effect. In particular, when the legacy scheme is used for actual communication environment, it may be able to anticipate degradation of performance.

A technical task of the present invention is to propose a scheme capable of successfully performing self-interference cancellation in frequency asynchronous environment that a frequency of a Tx signal is different from a frequency of an Rx signal. Basically, assume that it is able to perfectly estimate channels of a Tx signal and an Rx signal.

An operation process of a legacy digital self-interference cancellation scheme is illustrated in FIG. 2. According to the legacy scheme, when two nodes perform full-duplex communication, since a frequency asynchronous situation is not considered in a situation that a self-interference signal and an Rx signal are received at the same time, frequency synchronization is configured in consideration of the Rx signal only. As a result, distortion occurs on the self-interference signal due to a frequency synchronization mismatch after the self-interference signal is passed through FFT. In particular, it is unable to sufficiently obtain interference cancellation performance using a self-interference cancellation scheme having a form of subtracting the multiplication of a Tx signal and a self-interference channel. This can be comprehended as a performance loss resulted from subtracting the multiplication of the Tx signal and the self-interference channel without reflecting the distortion due to the frequency synchronization mismatch. Consequently, according to the legacy scheme, performance is degraded in the aspect of SINR. The frequency asynchronous phenomenon occurs in actual communication environment due to a mismatch phenomenon between oscillators of two nodes and a Doppler effect. In particular, when the legacy scheme is used for actual communication environment, it may be able to anticipate degradation of performance.

Figure 6:
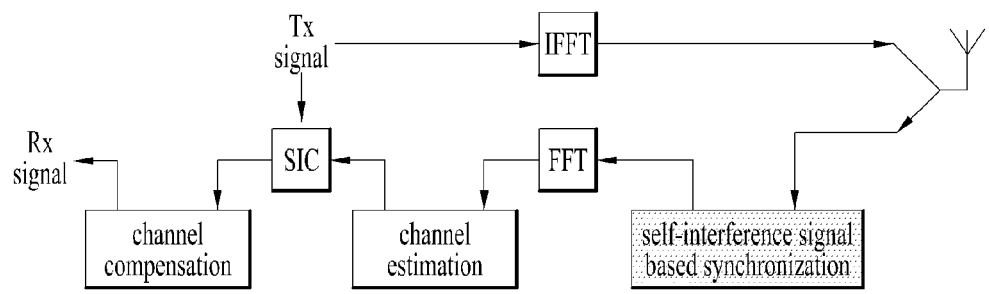
FIG. 6 is a diagram for explaining a method of operating a structure identical to a structure of a legacy self-interference cancellation scheme by changing a reference for frequency synchronization with a self-interference signal only.

FIG. 6 is a diagram for explaining a method of operating a structure identical to a structure of a legacy self-interference cancellation scheme by changing a reference for frequency synchronization with a self-interference signal only.

Referring to FIG. 6, a part (i.e., the part synchronized on the basis of a self-interference signal) different from the self-interference cancellation scheme proposed in FIG. 5 is represented by hatching. When frequency synchronization is matched on the basis of a self-interference signal, since the frequency synchronization is performed on the basis of an oscillator of a reception node, it is not necessary to perform additional frequency compensation. In case of using the scheme above, since distortion due to frequency asynchronization does not occur on a self-interference signal, although self-interference cancellation is performed using the self-interference cancellation scheme mentioned earlier in FIG. 5, there is no problem. However, an Rx signal experiences a frequency asynchronous phenomenon and distortion occurs, thereby degrading performance.

In FIGS. 5 and 6, frequency synchronization is configured on the basis of a signal among a Tx signal and an Rx signal. However, since the self-interference cancellation schemes illustrated in FIGS. 5 and 6 configure synchronization on the basis of a single signal only, self-interference cancellation performance or Rx signal detection performance can be deteriorated.

In order to solve the problem above, the present invention proposes a scheme of measuring frequency synchronization for a Tx signal and frequency synchronization for an Rx signal, respectively.

Figure 7:
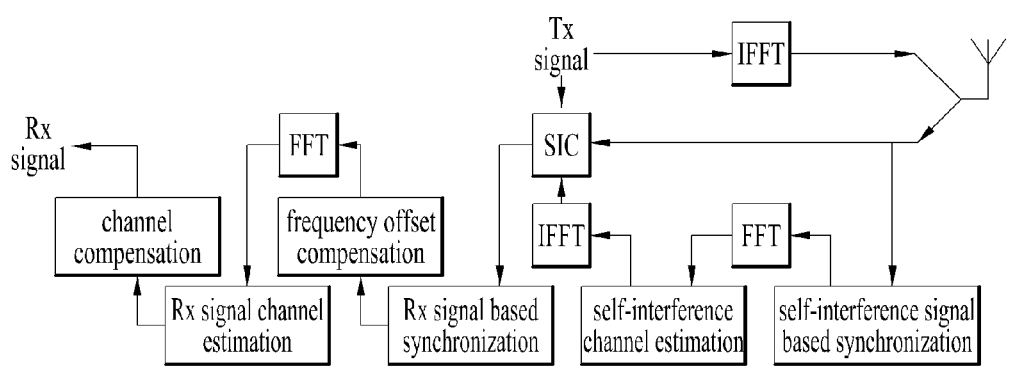
FIG. 7 is an exemplary diagram for explaining a method of performing digital self-interference cancellation in a network node according to the present invention.

FIG. 7 is an exemplary diagram for explaining a method of performing digital self-interference cancellation in a network node according to the present invention.

Referring to FIG. 7, first of all, a receiving end of a network node matches frequency synchronization on the basis of a self-interference signal to cancel self-interference and performs FFT calculation. Subsequently, the receiving end can obtain channel information by estimating a self-interference channel Subsequently, the receiving end generates a self-interference signal based on information on the estimated self-interference channel and converts the self-interference signal into a time axis by performing IFFT calculation on the generated self-interference signal. As illustrated in SIC of FIG. 7, the receiving end can perform SIC (Self-Interference Cancellation) in a manner of subtracting the self-interference signal converted into the time axis from an Rx signal received from a different network node and a signal to which a self-interference signal is added.

The receiving end can detect a preamble (or a pilot signal) for measuring frequency synchronization of an Rx signal from a signal to which a self-interference cancellation scheme is applied. Hence, the receiving end can measure the frequency synchronization of the Rx signal again on the basis of the detected preamble. The receiving end compensates for a frequency offset on the basis of the frequency synchronization of the measured Rx signal, performs FFT calculation (by performing sampling), and estimates a channel of the Rx signal. Subsequently, the receiving end detects the Rx signal via channel compensation.

When a frequency domain interference cancellation scheme is applied, additional calculation for converting a signal into a time domain is required after interference is cancelled. On the other hand, when the scheme illustrated in FIG. 7 is applied, since it is able to prevent interference between a Tx signal and an Rx signal, it is able to prevent performance deterioration due to frequency asynchronous environment between nodes performing communication in FDR mode.

Figure 8:
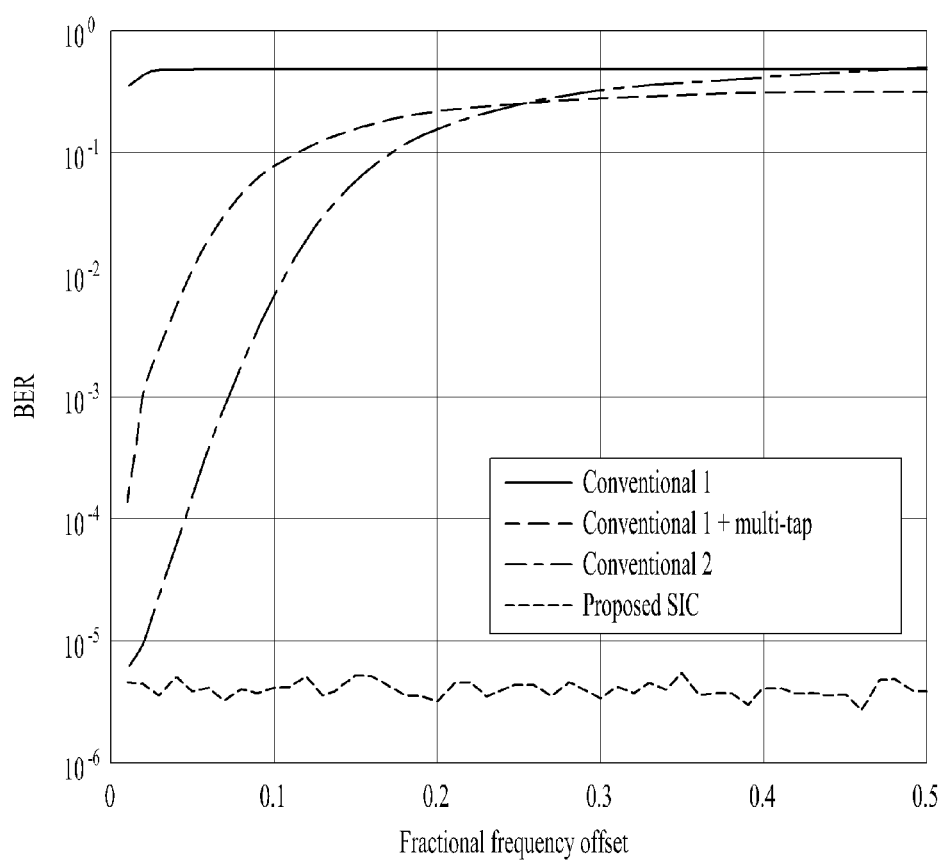
FIG. 8 is a diagram illustrating a performance difference between a legacy digital self-interference cancellation scheme and a digital self-interference cancellation scheme proposed in the present invention according to a frequency asynchronous level.

FIG. 8 is a diagram illustrating a performance difference between a legacy digital self-interference cancellation scheme and a digital self-interference cancellation scheme proposed in the present invention according to a frequency asynchronous level.

FIG. 8 illustrates a difference of bit error rate (BER) performance between a legacy digital self-interference cancellation scheme and a digital self-interference cancellation scheme proposed in the present invention according to a frequency asynchronous level. In FIG. 8, assume that SIR (Signal-to-Interference Ratio) and SNR (Signal-to-Noise Ratio) correspond to 40 dB and 10 dB, respectively, and QPSK modulation scheme is used. In this case, assume that a channel corresponds to AWGN channel. When a frequency asynchronous level has an error of integer multiple, it is able to easily correct the error. Hence, a case of an error of decimal multiple is considered only because the error of decimal multiple becomes an actual problem.

As illustrated in FIG. 8, when legacy digital self-interference schemes (conventional 1+multi-tap, conventional 2) are applied, it is able to see that BER performance is considerably degraded even when a little frequency synchronization mismatch occurs. In this case, if distortion of a self-interference signal is reflected by using multi-tap on the legacy digital self-interference scheme, it may have a performance gain. However, compared to the digital self-interference cancellation scheme (proposed SIC) proposed in the present invention, when a frequency offset of a low level occurs, it is able to see that BER performance is more radically deteriorated. This is because, since power of a self-interference signal is much stronger than power of an Rx signal, performance enhancement is high at a side capable of precisely cancelling the self-interference signal. And, when a frequency offset is less, since distortion of the Rx signal is less, performance loss is less. On the contrary, when frequency synchronization is measured twice for a Tx signal and an Rx signal, it is able to see that BER performance is constant irrespective of a frequency asynchronous level (Conventional 1).

In the foregoing description, an operation process of a self-interference cancellation scheme has been explained in consideration of frequency asynchronous environment in communication environment in FDR mode.

Figure 9:
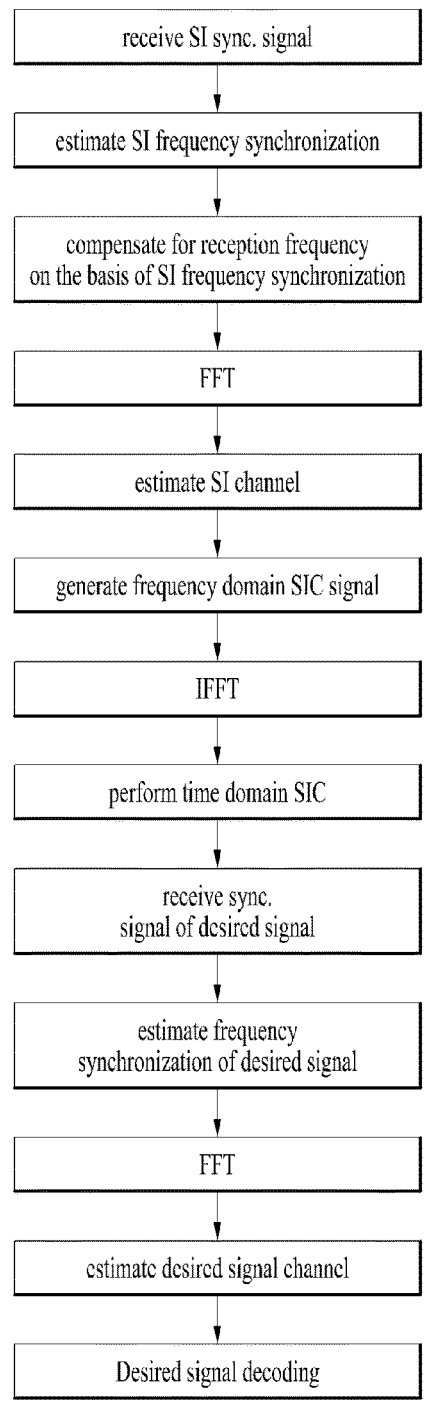
FIG. 9 is a flowchart for explaining a method of respectively measuring synchronization for a transmission signal and synchronization for a reception signal in consideration of frequency asynchronous environment in communication environment in an FDR mode.

FIG. 9 is a flowchart for explaining a method of respectively measuring synchronization for a Tx signal and synchronization for an Rx signal in consideration of frequency asynchronous environment in communication environment in an FDR mode.

An operation process for a scheme of respectively measuring frequency synchronization of a Tx signal and frequency synchronization of an Rx signal is described in the following. A receiving end receives a self-interference synchronization signal. The self-interference synchronization signal may correspond to a preamble signal for estimating frequency synchronization of a Tx signal. The receiving end estimates frequency synchronization of a self-interference (SI) signal using a preamble of the Tx signal. The receiving end performs FFT calculation on the basis of the estimated frequency synchronization and can estimate a self-interference channel based on a sampled signal. The receiving end compensates for a frequency of an Rx signal on the basis of the frequency synchronization of the self-interference signal and may perform FFT calculation.

The receiving end generates a self-interference signal based on a self-interference channel estimated in a frequency domain and converts the self-interference signal into a signal in a time domain via IFFT calculation. Subsequently, the receiving end performs self-interference signal cancellation in the time domain. In particular, the receiving end can perform the self-interference cancellation in a manner of subtracting a self-interference signal generated in the time domain from an Rx signal received from a different network node and a signal to which a generated self-interference signal is added.

Subsequently, since the receiving end is able to detect a preamble (or a pilot signal) for measuring frequency synchronization of an Rx signal (desired signal) from a signal to which the self-interference cancellation scheme is applied, the receiving end can measure frequency synchronization of the Rx signal (desired signal) again on the basis of the detected preamble. The receiving end compensates for a frequency offset on the basis of the frequency synchronization of the measured Rx signal (desired signal), performs FFT calculation (by performing sampling), and estimates a channel of the Rx signal. Subsequently, the receiving end detects the Rx signal by performing decoding on the Rx signal.

As mentioned in the foregoing description, when two network nodes perform communication in FDR mode, a problem may occur due to frequency asynchronous environment. In order to solve the problem, the present invention proposes a self-interference cancellation scheme in consideration of the frequency asynchronous environment. According to the self-interference cancellation scheme proposed in the present invention, it is able to successfully perform self-interference cancellation and reception signal detection using a method of respectively performing frequency synchronization on a Tx signal and an Rx signal in environment that two network nodes transmit a signal at the same time and a frequency offset occurs due to an oscillator error and a Doppler effect.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of cancelling a self-interference signal in a situation of operating in an FDR mode and an apparatus therefor can be industrially applied to a next generation communication system such as 5G communication system and the like.

What is claimed is:

1. A method of cancelling a self-interference signal by a first network node operating in an FDR (Full Duplex Radio) mode in a wireless network, the method comprising:
   receiving the self-interference signal and a reception signal received from a second network node,
   wherein a first frequency synchronization of the self-interference signal does not match a second frequency synchronization of the reception signal,
   estimating the first frequency synchronization of the self-interference signal using a preamble;
   cancelling the self-interference signal based on the estimated first frequency synchronization of the self-interference signal;
   estimating the second frequency synchronization of the reception signal using a residual signal after the cancelling the self-interference signal,
   decoding the reception signal based on the estimated second frequency synchronization of the reception signal,
   wherein the preamble is for a frequency synchronization of a transmission signal.

2. The method of claim 1, wherein the cancelling the self-interference signal further comprises:
   transforming the self-interference signal into a signal of a frequency domain based on the first frequency synchronization of the self-interference signal;
   estimating the channel of the self-interference signal based on the transformed signal of the frequency domain;
   generating a self-interference signal in the frequency domain based on the channel estimation of the self-interference signal; and
   transforming the generated self-interference signal in the frequency domain into a self-interference signal of a time domain.

3. The method of claim 2, wherein the cancelling the self-interference signal further comprises cancelling the self-interference signal by subtracting the transformed self-interference signal of the time domain from the reception signal received from the second network node and the synchronization self-interference signal.

4. The method of claim 1, wherein the second network node operates in the FDR mode.

5. The method of claim 1, further comprising:
   transforming the residual signal into a residual signal of a time domain after the compensating for a frequency offset based on the second frequency synchronization of the reception signal; and
   detecting the reception signal based on channel estimation on the transformed residual signal of the time domain.

6. The method of claim 1, wherein an estimation of the second frequency synchronization of the reception signal is performed based on a preamble of the reception signal contained in the residual signal after the self-interference signal is cancelled.

7. A first network node operating in an FDR (Full Duplex Radio) mode for cancelling a self-interference signal in a wireless network, the first network node comprising:
   a transceiver; and
   a processor configured to:
     receive the self-interference signal and a reception signal received from a second network node,
     wherein a first frequency synchronization of the self-interference signal does not match a second frequency synchronization of the reception signal
     estimate the first frequency synchronization of the self-interference signal using a preamble of a transmission signal,
     cancel the self-interference signal by estimating a channel of the self-interference signal based on the estimated first frequency synchronization of the self-interference signal,
     estimate the second frequency synchronization of the reception signal using a residual signal after the cancelling the self-interference signal, and
     decoding the reception signal based on the estimated second frequency synchronization of the reception signal,
     wherein the preamble is for a frequency synchronization of a transmission signal.

8. The first network node of claim 7, wherein:
   the processor is further configured to:
     transform the self-interference signal into a signal of a frequency domain based on the first frequency synchronization of the self-interference signal,
     estimate the channel of the self-interference signal based on the transformed signal of the frequency domain,
     generate a self-interference signal of the frequency domain based on the channel estimation of the self-interference signal, and
     transform the generated self-interference signal of the frequency domain into a self-interference signal of the time domain.

9. The first network node of claim 8, wherein the processor is further configured to cancel the self-interference signal by subtracting the transformed self-interference signal of the time domain from the reception signal received from the second network node and the self-interference signal.

10. The first network node of claim 7, wherein:
the processor is further configured to:
transform the residual signal into a residual signal of a time domain after the compensating for a frequency offset based on the second frequency synchronization estimation of the reception signal, and
detect the reception signal based on channel estimation on the transformed residual signal of the time domain.

11. The first network node of claim 7, wherein the second network node operates in the FDR mode.

12. The first network node of claim 7, wherein an estimation of the second frequency synchronization of the reception signal is performed based on a preamble of the reception signal contained in the residual signal after the self-interference signal is cancelled.

\* \* \* \* \*